(12) United States Patent
Benton

(10) Patent No.: US 6,555,837 B2
(45) Date of Patent: Apr. 29, 2003

(54) FLUOROPOLYMER FLUID OVERFILL PROBE

(75) Inventor: Frances H. Benton, Harrisville, NH (US)

(73) Assignee: Scully Signal Company, Wilmington, MA (US)

( * ) Notice: Subject to any disclaimer, the term of this patent is extended or adjusted under 35 U.S.C. 154(b) by 0 days.

(21) Appl. No.: 10/212,600

(22) Filed: Aug. 5, 2002

(65) Prior Publication Data

US 2002/0185619 A1 Dec. 12, 2002

Related U.S. Application Data

(63) Continuation of application No. 08/599,192, filed on Feb. 9, 1996, now Pat. No. 6,448,573.

(51) Int. Cl.[7] ............................................. G01N 15/06
(52) U.S. Cl. ........................ 250/577; 250/903; 340/619
(58) Field of Search ................................. 250/577, 902, 250/903, 227.25, 227.29, 341.2, 239; 340/619; 73/293; 356/136

(56) References Cited

U.S. PATENT DOCUMENTS

| | | |
|---|---|---|
| 4,197,459 A | 4/1980 | Perren |
| 4,320,291 A | 3/1982 | Uramoto |
| 4,749,274 A | 6/1988 | Aoki et al. |
| 4,840,137 A | 6/1989 | Beauvais et al. |
| 4,998,022 A | 3/1991 | Tregay |
| 5,029,471 A | 7/1991 | Goodrich |
| 5,200,615 A | 4/1993 | Hopenfeld |
| 5,534,708 A | 7/1996 | Ellinger et al. |
| 5,565,978 A | 10/1996 | Okubo et al. |
| 6,448,573 B1 * | 9/2002 | Benton ........................ 250/577 |

* cited by examiner

*Primary Examiner*—Kevin Pyo
(74) *Attorney, Agent, or Firm*—Kudirka & Jobse, LLP

(57) ABSTRACT

An optically-based overfill detection probe is provided that has a prism made of a fluoropolymer, preferably TEFLON® PFA. The prism material has a high resistance to chemical solvents, is less prone to condensation and frost than plastic or glass, and enables the production of prisms at significantly less cost than glass. The probe also includes a two-piece housing structure that compresses an outwardly-extending portion of the prism material to firmly hold the prism in place, and forces the material into sealing contact with an inner surface of the housing. The housing has an elongate portion that encompasses the prism, and which extends toward the fluid, preventing any light which escapes the prism from being externally reflected back to the photodetector of the probe.

18 Claims, 4 Drawing Sheets

FLUOROPOLYMER FLUID OVERFILL PROBE

CROSS-REFERENCE TO RELATED APPLICATIONS

This is a continuation of U.S. patent application Ser. No. 08/599,192, filed Feb. 9, 1996, now U.S. Pat. No. 6,448,573, and entitled "FLUOROPOLYMER FLUID OVERFILL PROBE WITH INFRARED OPTICAL SIGNAL."

FIELD OF THE INVENTION

This invention relates to fluid transfer control apparatus and, particularly, to the use of optically-based overfill probes for detecting when fluid being transferred into a container has reached a predetermined level.

BACKGROUND OF THE INVENTION

In the art of fluid transfer control, particularly as it applies to the petroleum industry, one of the more common control devices is an overfill sensor for determining when the fluid being transferred into a container, such as a petroleum tanker compartment, has reached a predetermined level. An output signal from such a probe indicates when the fluid has reached the predetermined level, and may be used as an indication by a fluid transfer controller to discontinue fluid flow into the container. In this way, overfilling of the container, which is particularly hazardous when dealing with flammable liquids such as gasoline, can be avoided.

One type of overfill probe which is particularly common in the petrochemical industry makes use of an optical signal which is coupled into a medium having a relatively high index of refraction, such as a glass or non-opaque plastic. This medium is specially-shaped and commonly referred to as a "prism." The prism is shaped to cause internal reflection of the optical signal when surrounded by air. The shape of the prism and the direction at which the optical signal is coupled into the prism is such that the reflection of the optical signal within the prism redirects the signal toward a photodetector. This photodetector generates an output signal which indicates that the optical signal is being detected.

A schematic illustration of this prior art probe design is shown in FIG. 1. In the plane of the optical signal path, the prism 10 has a triangular cross section. The optical signal is generated by light source 12. When the prism 10 is surrounded by air, the optical signal (indicated by the arrows in FIG. 1) is reflected at two interfaces between the prism material and the surrounding air, and redirected toward photodetector 14. The photodetector 14 generates an electrical output signal which indicates that the optical signal is being detected.

As shown in FIG. 1, the prior art prism 10 uses a forty-five degree incidence angle (relative to normal) for each of the reflections of the optical signal within the prism 10. This prism 10 has the triangular cross section shown, and light source 12 and photodetector 14 are oriented in the same direction along the same surface of the prism 10. When in use, the prism is part of a probe which is located within a fluid container, usually near the top of the container. When the fluid in the container rises high enough to contact a prism surface at a location where the optical signal is incident, the forty-five degree angle is no longer sufficient to provide internal reflection of the optical signal at that interface. This is because the prism/air interface becomes a prism/fluid interface, and the fluid has an index of refraction much closer to the prism material than does air. According to Snell's law of refraction, (well-known in the art of optical design) the forty-five degree angle of incidence of the optical signal now results in the transmission of the optical signal through the interface due to the similarity of the relative indices of refraction. As a result, the signal is no longer detected by photodetector 14, and the corresponding change in the photodetector output signal is used to discontinue loading of the container.

One of the problems encountered with a prior art probe such as that shown in FIG. 1 is related to the operational temperature range of the probe. When the probe is used in cold ambient temperatures (common for a petroleum tanker truck which has the probe within one of its tanker compartments and which delivers fuel in regions having relatively cold climates), is that condensation, or even frost, may form on the external surfaces of the prism. If sufficient condensation forms on the prism when the fluid level in the container is below that at which it should be detected by the probe, the condensation may nonetheless cause transmission of a significant portion of the optical signal through the surface of the prism. This portion of the signal then goes undetected by the photodetector. If the signal loss is high enough, the signal detected by the photodetector (and indicated by the photodetector output signal) may be below the detection threshold used to indicate when the fluid in the container has reached the probe level. As a result, a false overfill signal may result which prevents fluid from being loaded into the container, despite the fact that the container may be empty.

In the past, one of the solutions to the condensation problem has been to increase the sensitivity of the photodetector so that it is activated by smaller amounts of reflected light. However, this also makes the probe more sensitive to inadvertent reflections from surfaces within the container. When the prism is in contact with the fluid, the light from the light source can pass through the fluid, be reflected off a reflective surface within the container, and find its way back to the photodetector. If the reflected signal is strong enough, this can result in a dangerous overfill situation, as the contact of the prism by the fluid goes undetected, and the container continues to be filled to the point of overflowing.

SUMMARY OF THE INVENTION

The improved overfill probe of the present invention makes use of an optical signal in the infrared (IR) range, generated from an IR source, such as an diode having an output in the IR range. The optical signal is coupled into a first medium of fluoropolymer, in the preferred embodiment TEFLON Perfluoro Alkoxy (TEFLON PFA), although other fluoropolymers may also be used. TEFLON PFA is manufactured by, and TEFLON® is a registered trademark of, E. I. du Pont de Nemours & Co., Inc. The prism has a particular shape which results in the internal reflection of the IR signal when the reflecting surfaces are contacted by a second medium (e.g. air) having an index of refraction significantly lower than that of the prism material. The reflection of the optical signal is toward a photodetector of the probe, which detects the optical signal and generates an output signal in response thereto.

The probe is located in a fluid container, such as a compartment of a petroleum tanker truck, with the prism positioned such that it is contacted by fluid in the container when the fluid is at a predetermined fluid level. The optical signal from the IR source is coupled into the prism and, while the fluid level is below the predetermined level (i.e.

while the probe is surrounded by the second medium), the optical signal is reflected by at least one interface between the prism and the second medium. The optical signal is ultimately directed toward the photodetector through internal reflection within the prism. As the container is filled with liquid, the fluid level rises toward the prism. When the fluid reaches the prism, the new optical interface formed by the prism and the fluid allows transmission of the optical signal through the interface. Without the reflection of the optical signal, the signal is no longer detected by the photodetector. As a result, the output signal of the photodetector changes, indicating that the optical signal is no longer detected, and the change can be used by a fluid transfer controller to discontinue fluid transfer into the container, thereby preventing overfilling.

In addition to the unique material of the probe prism of the present invention, the prism is also a unique shape. In particular, the prism has a cross-sectional shape which is preferably substantially a quadrilateral. This cross-sectional shape results in the light source and photodetector not being oriented in the same direction, but also provides a higher angle of incidence (relative to normal) of the optical signal on the internally reflective surfaces of the prism. There is therefore less chance of optical leakage through the reflective surfaces of the prism due to localized surface irregularities (i.e. due to the surface not being perfectly smooth on a microscopic level, as may result from moisture or frost) and better overall signal performance.

The present invention also includes a two-piece probe housing which screws together to enclose the probe components. The tightening together of the housing portions compresses an outwardly-extending portion of the prism material, firmly holding it in place. The compression of this material also causes it to flow outwardly, sealing it against an inner surface of the housing. The housing also includes a lower portion which is roughly cylindrical with cutouts along its surface. The cutouts allow air to escape as fluid rises within the cylindrical portion. The surfaces of the lower portion surrounding the cutouts prevent light from the light source from being inadvertently reflected off a reflective surface within the container back to the photodetector when fluid in the container is in contact with the prism.

DETAILED DESCRIPTION

Figure 1:
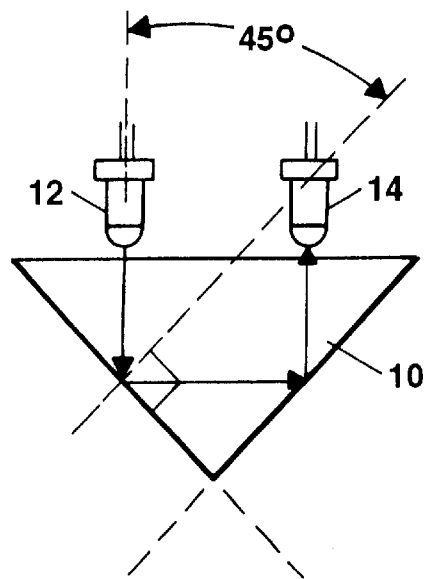
FIG. 1 is a schematic depiction of the optical prism of a typical prior art fluid overfill probe.
Figure 2:
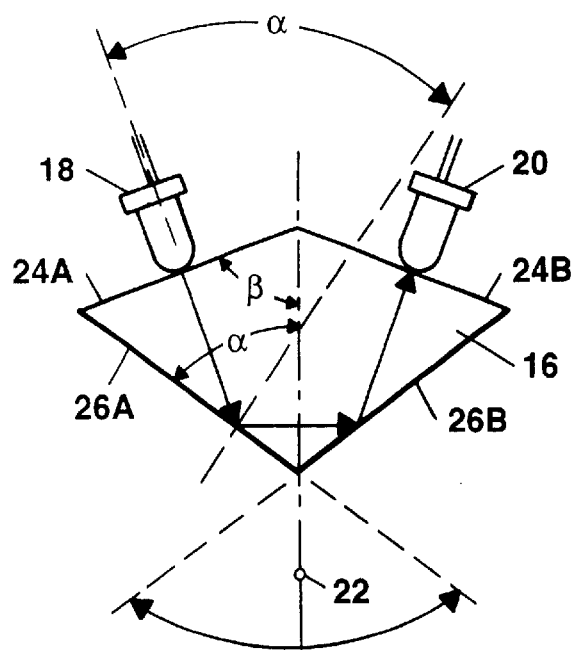
FIG. 2 is a schematic depiction of the optical prism of a fluid overfill probe according to the present invention.

The overfill probe of the present invention uses an optical signal which is coupled into a prism 16 by a light source 18. FIG. 2 is a cross-sectional schematic illustration of the probe 16 and light source 18. In the preferred embodiment, the prism 16 is made of one of several different types of fluoropolymer. In the preferred embodiment, TEFLON® PFA (perfluoro alkoxy) is used, which is manufactured by E. I. du Pont De Nemours & Co., Inc., while in an alternative embodiment the prism is TEFLON FEP (fluorinated ethylene propylene). It will be understood by those skilled in the art that other materials (particularly other fluoropolymers) may be used which provide similar qualities to those mentioned above. Hereinafter, the term "TEFLON" is used to refer generally to the fluoropolymer materials which are particularly well-suited for the present invention.

The TEFLON material used has the advantage that it is chemically inert to most industrial chemicals and solvents. As such, the prism can come in contact with any of a wide array of different chemical liquids and gases without being damaged. This allows the probe to be used in a wide variety of different liquid detection applications. TEFLON prisms also have a distinct advantage over glass or plastic prisms when used in probes for overfill detection in the petrochemical industry, such as in the compartments of tanker trucks. This advantage lies in the fact that TEFLON is much less prone to optical signal loss due to condensation or frost on the surface of the probe. The TEFLON prism is also significantly less expensive to produce than a glass prism. Furthermore, while inhibiting transmission of visible light, a TEFLON probe is more transmissible to light in the infrared (IR) band than is a glass probe. Light emitting diodes (LEDs) which emit light at an IR wavelength have a particularly good optical power output, one which, for the same electrical power input, is typically higher than that of LEDs at the visible wavelengths commonly used with glass or plastic prisms. Therefore, in the preferred embodiment, light source 18 is an infrared LED.

Referring again to FIG. 2, the cross-sectional shape of the prism of the present invention is quadrilateral, as opposed to the triangular cross-sectional shape of prior art prisms. As such, the LED 18 and the photodetector 20 are oriented in different directions along different cross-sectional surfaces. The "surfaces" 24A, 24B, 26A, 26B of FIG. 2 are referred to as "cross-sectional" surfaces since, in actuality, the top of the prism and the bottom of the prism each can be, and in the preferred embodiment each is, a single conical surface. However, it will be understood by those skilled in the art that the important geometry of the prism is the roughly planar cross section within which the bulk of the optical signal travels through the prism. The relevant geometry of the prism is therefore described herein with reference to the cross section of FIG. 2. Obviously, neither the top nor bottom of the prism therefore need to be conical, and could be pyramidal or hemispherical, for example.

In the preferred embodiment, the FIG. 2 cross section of prism 16 is symmetrical about center line 22. This symmetry simplifies manufacture of the prism and determination of its relevant dimensions. However, such symmetry is not necessary, provided the relevant cross-sectional angular relationship between LED 18, photodetector 20 and the reflective prism surfaces is maintained. In the preferred embodiment, the shape of the prism may be defined by two angles within the cross sectional plane shown in FIG. 2. The first angle, a, is the angle from normal at which the light rays are incident upon the surfaces 26A, 26B of the prism. The second angle, $\beta$, is one half the internal angle between surfaces 24A and 24B (i.e. the angle between either of surfaces 24A, 24B and center line 22). Given either of these angles, the other may be determined by the following relationship:

$$\beta = 2(90° - \alpha)$$

This relationship also depends on LED 18 and photodetector 20 being oriented so as to transmit and receive light, respectively, in a direction normal to surfaces 24A, 24B. Variations of the present invention might use different orientations for LED 18 and photodetector 20, and thereby alter the geometry of the prism but, for maximum optical coupling through surfaces 24A, 24B and ease of manufacture, the present invention uses a perpendicular orientation of the LED 18 and photodetector 20 relative to the surfaces 24A, 24B.

In the preferred embodiment, the use of TEFLON PFA requires that α is greater than approximately 47.79°. This limitation results from an application of Snell's law of refraction, given the manufacturer's listed index of refraction of TEFLON PFA. The 47.79° limit is approximate since the listed index of refraction is based on the ASTM testing standard, and is not specifically matched to the IR wavelength of LED 18. In the preferred embodiment, the angle α=55° and, therefore, the angle β=70°.

While the quadrilateral cross-sectional shape of the prism 16 is particularly well-suited to the TEFLON materials preferred with the present invention, it is noted that this geometry may also have beneficial effects for other materials, including the glass and plastics of conventional prisms. For example, the quadrilateral shape allows a higher angle of incidence (relative to normal) on the reflective surfaces than a triangular cross section, while still having a perpendicular orientation of the LED and photodetector relative to the surfaces through which they transmit and receive light, respectively.

Figure 3:
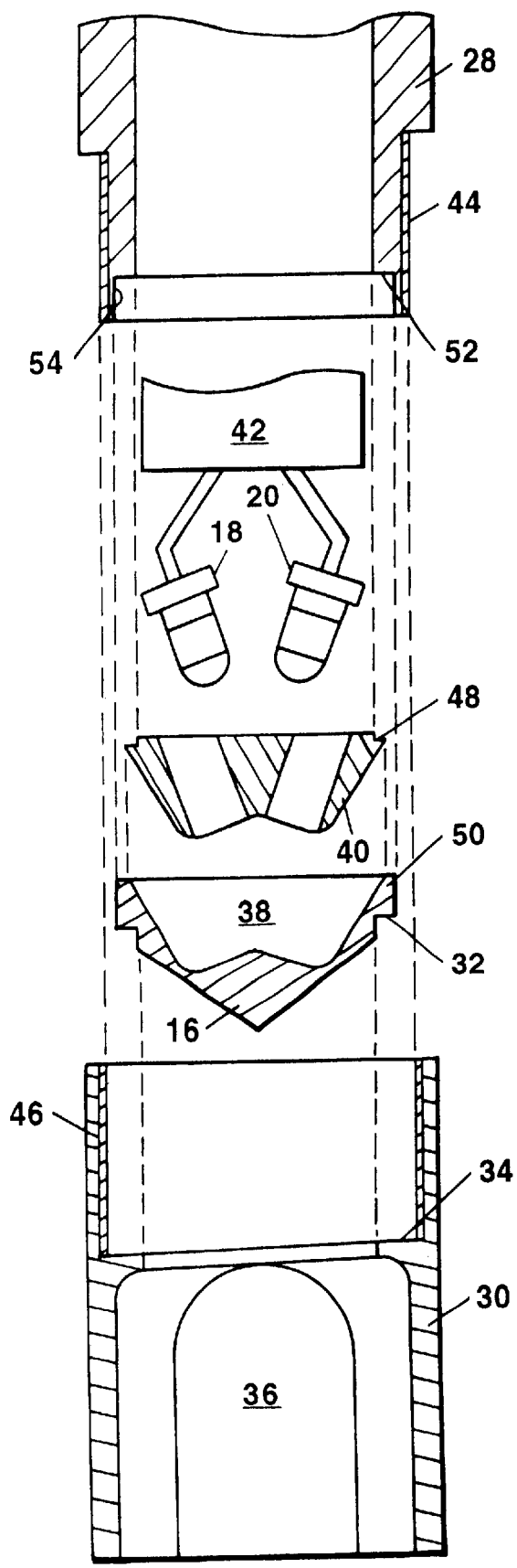
FIG. 3 is a cross-sectional, exploded view of a fluid overfill probe according to the present invention.
Figure 4:
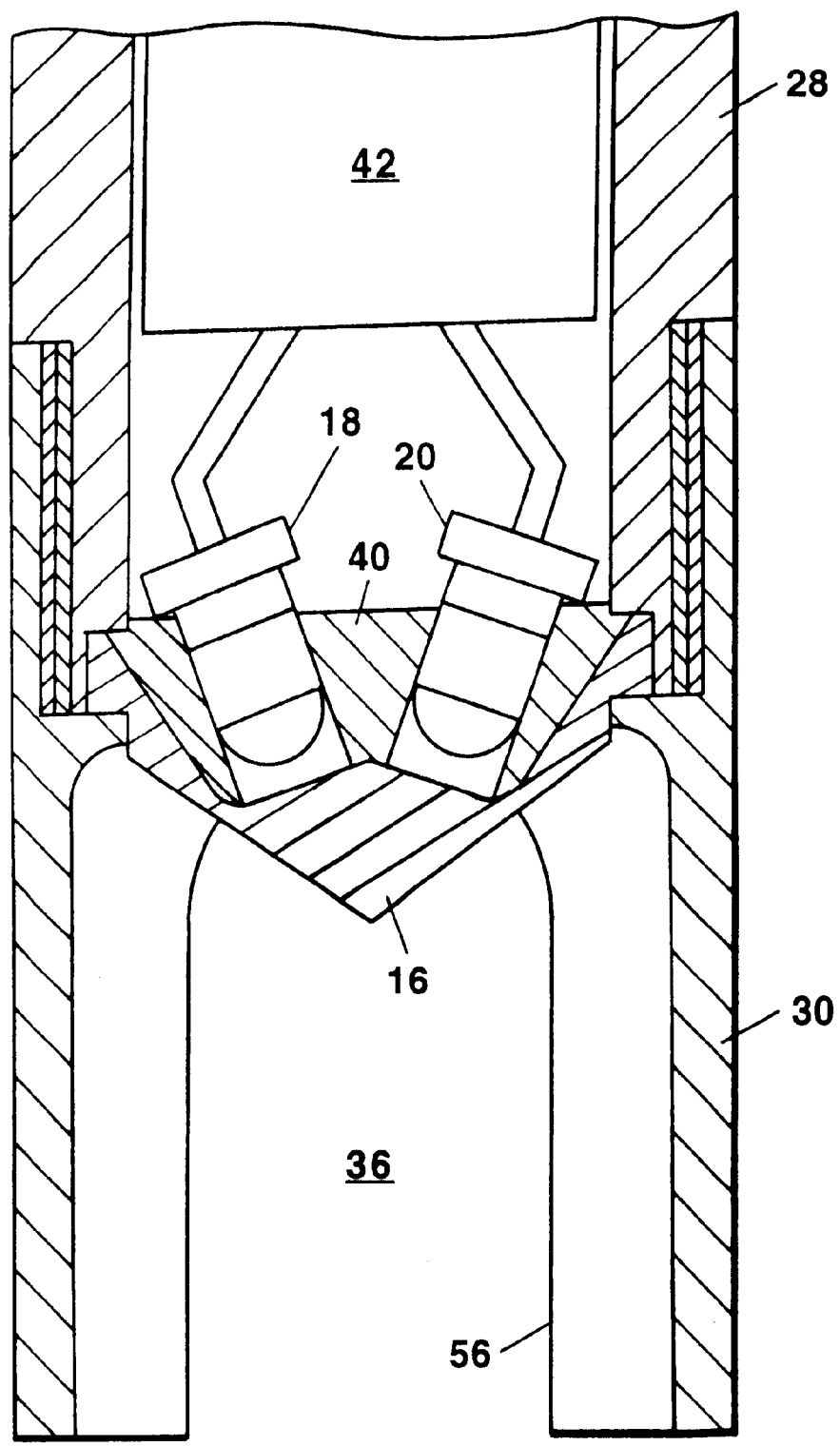
FIG. 4 is a cross-sectional assembled view of the fluid overfill probe of FIG. 3.

A preferred embodiment of the present invention makes use of a two-piece probe housing, as in FIGS. 3 and 4. FIG. 3 is a cross-sectional exploded view of a probe according to the present invention, in which the components of the probe are located within a probe housing comprising upper portion 28 and lower portion 30. As shown in FIG. 3, the prism 16 includes a portion which extends outward so as to form mounting seat 32. When the prism is located with the housing, seat 32 sits flush against lip 34 of lower housing portion 30. This keeps the prism centered within opening 36 of lower portion 30, into which fluid may rise when the probe is positioned within a container being filled. Hereinafter, the entire TEFLON structure (including the outwardly-extending portion as well as the optical portion having the substantially quadrilateral shape) will be referred to as the prism 16.

On the upper side of prism 16 is a cavity 38 which receives optical seat 40. Optical seat 40 is roughly the shape of a truncated cone, although the surface of the seat 40 facing prism 16 is itself conical, and shaped to fit snugly against the upper surface of prism 16. Optical seat 40 has two bores through its body, one of which receives LED 18, and one of which receives photodetector 20. The bores in seat 40 are sized to snugly accommodate the LED 18 and photodetector 20, respectively, and are angled so as to orient each of the LED and photodetector normal to the surface of prism 16 which it faces. Thus, when the optical seat 40 is fitted within cavity 38, and LED 18 and photodetector 20 are mounted within their respective bores, light is transmitted from the LED 18 at an angle of 90° relative to the prism surface through which it is directed, and light is received by the photodetector 20 at an angle of 90° relative to the prism surface through which it is received.

Also shown in FIG. 3 is circuit board 42 to which the LED 18 and photodetector 20 are electrically connected. The circuit board 42 is shown in cutaway so as not to obscure the features of upper housing portion 28. Those skilled in the art will understand that the circuit board 42 resides within the hollow body of upper portion 28, and contains electrical circuitry used in the generation of optical signals by LED 18 and the processing of optical signals detected by photodetector 20.

When the probe is assembled, screw threads 44 of upper housing portion 28 are meshed with complementary screw threads 46 of lower housing portion 30, such that the two portions are screwed tightly together. An annular lip of optical seat 40, and an annular top surface 50 of the prism (which are flush with each other when assembled) are contacted by the annular lip 52 of upper housing portion 28. When the two housing portions are completely screwed together, the separation between upper portion lip 50 and lower portion lip 34 is less than the originally-fabricated distance between annular lip 52 and mounting seat 32. The housing surfaces 34, 52 therefore compress the prism material in this annular region. Since TEFLON (both PFA TEFLON and FEP TEFLON) flows under pressure, the prism material flows outward toward the inner surface 54 of the upper housing portion 28. This forcing of the material against the inside of the housing provides the probe with a good seal to help prevent liquid or gas from seeping into the probe housing from the container.

The probe of FIG. 3 is depicted in its assembled form in FIG. 4. The top of the probe and circuit board 42 are shown in cutaway to provide more detail of the probe components. As shown, the portion of the probe material between the lip 50 and mounting seat 32 is forced against the inside of the upper housing portion 28 forming the aforementioned seal. The opening 36 in lower housing portion 30 is generally cylindrical, being open at the bottom, but includes two cutouts 56 (only one being shown in the cross section of FIG. 4, the other existing opposite it in the housing body). These cutouts allow air to escape while fluid enters the opening 36 as it rises in the container within which it is mounted.

The part of the lower housing portion which is not cut out extends to a length at which, if a reflective surface was in contact with the end of the lower housing portion, and fluid was in contact with the prism, no light from the LED would be reflected from the reflective surface back to the photodetector. This prevents an unexpected reflective surface (such as a shiny metal container surface or a white piece of material floating in the container) from causing a false detection of the optical signal by the photodetector. This part of the lower portion also reduces the effects of ambient light on the probe, and protects the prism from scratching.

Figure 5:
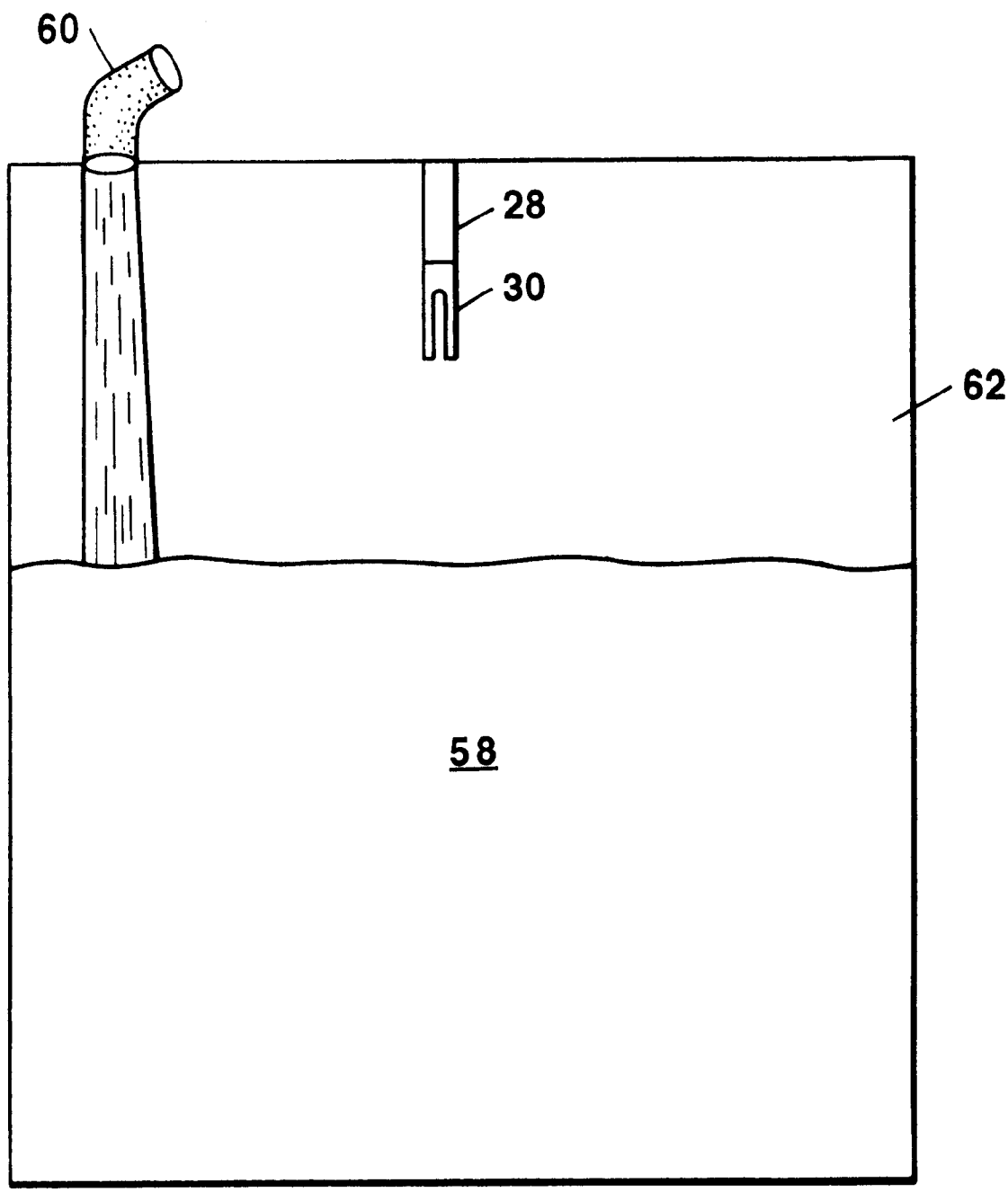
FIG. 5 is a cross-sectional view of a fluid container within which is located a fluid overfill probe according to the present invention.

FIG. 5 shows a probe according to the present invention within a fluid container 62. This figure is not to scale, but is used to demonstrate the functionality of the overfill probe. As the container 62 is filled with a liquid 58 from nozzle 60, the liquid level rises toward the probe. When the liquid 58 contacts the probe prism, the optical signal of the probe is no longer reflected within the body of the prism, and escapes through the prism surface into the fluid. The resulting change in the output of the probe photodetector is then used as an indication that the container is full, and the flow of fluid 58 into the container is discontinued.

While the invention has been shown and described with regard to a preferred embodiment thereof, those skilled in the art will recognize that various changes in form and detail may be made herein without departing from the spirit and scope of the invention as defined by the appended claims.

What is claimed is:

1. A fluid overfill detection probe comprising:
   a light source which emits an optical signal;
   a photodetector which detects the optical signal;
   a prism into which the optical signal is coupled by the light source, the prism comprising a fluoropolymer material that results in an internal reflection of the optical signal from the light source toward the photodetector when a surface of the prism at which said reflection occurs is not contacted by a fluid being detected, and that does not result in said internal reflection when said prism surface is contacted by said fluid, the prism having an outwardly extending portion; and a housing surrounding the prism and forming a fluid seal with the outwardly extending portion, the housing being connectable to the prism such that the outwardly extending portion is compressed between multiple surfaces.

2. A fluid overfill detection probe according to claim 1 wherein the prism material comprises TEFLON PFA.

3. A fluid overfill detection probe according to claim 1 wherein the prism material comprises TEFLON FEP.

4. A fluid overfill detection probe according to claim 1 wherein the light source emits light at a wavelength in the infrared band.

5. A fluid overfill detection probe according to claim 1 wherein the outwardly extending portion and the prism are formed from a single piece of material.

6. A fluid overfill detection probe according to claim 1 wherein the light source and photodetector and are housed within the housing.

7. A fluid overfill detection probe according to claim 1 wherein the housing comprises a plurality of portions that each comprise one of said multiple surfaces between which the outwardly extending portion is compressed.

8. A fluid overfill detection probe according to claim 7 wherein the housing portions have complementary screw threads which allow them to be screwed together.

9. A fluid overfill detection probe according to claim 1 wherein the outwardly extending portion extends radially relative to an axis parallel to a direction along which a level of said fluid changes.

10. A fluid overfill detection probe comprising:

a light source which emits an optical signal having a center wavelength in the infrared range;

a photodetector which detects the optical signal;

a prism into which the optical signal is coupled by the light source, the prism material comprising a fluoropolymer and providing internal reflection of the optical signal from the light source toward the photodetector when a surface of the prism at which said reflection occurs is not contacted by a fluid being detected, the prism not providing said internal reflection when said prism surface is contacted by said fluid, the prism having an outwardly extending portion; and a housing that surrounds the light source, photodetector and prism, and makes contact with the outwardly extending portion so as to form a fluid seal, the housing having multiple portions with opposing surfaces between which the outwardly extending portion is compressed.

11. A method of constructing an optically-based overfill probe, the method comprising:

forming a prism of the probe from a fluoropolymer having an outwardly extending portion;

providing an light source that couples light into the prism, such that the light from the light source is internally reflected off at least one internal surface of the prism when the prism is surrounded by air;

providing a photodetector that detects the internally reflected light; and locating the prism in a housing that contacts the prism so as to form a fluid seal with the outwardly extending portion, the housing being connectable to the prism such that the outwardly extending portion is compressed between multiple surfaces.

12. A method according to claim 11 wherein the prism material comprises TEFLON PFA.

13. A method according to claim 11 wherein the prism material comprises TEFLON FEP.

14. A method according to claim 11 wherein the light source has a center wavelength in the infrared band.

15. A method according to claim 11 wherein the outwardly extending portion and the prism are formed from a single piece of material.

16. A method according to claim 11 wherein the housing comprises a plurality of portions that each comprise one of said multiple surfaces between which the outwardly extending portion is compressed.

17. A method according to claim 16 wherein the housing portions have complementary screw threads which allow them to be screwed together.

18. A method according to claim 1 wherein the outwardly extending portion extends radially relative to an axis parallel to a direction along which a level of said fluid changes.

* * * * *